US008554864B2

(12) United States Patent
Liu et al.

(10) Patent No.: US 8,554,864 B2
(45) Date of Patent: Oct. 8, 2013

(54) SYSTEM AND METHOD TO SYNCHRONOUSLY DISPLAY 3D OBJECT INFORMATION ON PLURAL SCREENS OF PLURAL COMPUTERS

(75) Inventors: Jianming Liu, Beijing (CN); Pingping Hu, Beijing (CN); Feng Zhao, Beijing (CN)

(73) Assignee: State Grid Information & Telecommunication Co., Ltd., Beijing (CN)

( * ) Notice: Subject to any disclaimer, the term of this patent is extended or adjusted under 35 U.S.C. 154(b) by 469 days.

(21) Appl. No.: 12/934,853

(22) PCT Filed: Feb. 19, 2009

(86) PCT No.: PCT/CN2009/070476
§ 371 (c)(1),
(2), (4) Date: Sep. 27, 2010

(87) PCT Pub. No.: WO2009/135393
PCT Pub. Date: Nov. 12, 2009

(65) Prior Publication Data
US 2011/0029931 A1 Feb. 3, 2011

(30) Foreign Application Priority Data

May 9, 2008 (CN) .......................... 2008 1 0106253

(51) Int. Cl.
*G06F 15/16* (2006.01)
*G06F 15/173* (2006.01)
(52) U.S. Cl.
USPC .......................... 709/209; 709/204; 709/223

(58) Field of Classification Search
USPC .................................. 709/208, 209, 204, 223
See application file for complete search history.

(56) References Cited

U.S. PATENT DOCUMENTS

| 2002/0055978 | A1* | 5/2002 | Joon-Bo et al. ................ 709/209 |
| 2005/0033656 | A1 | 2/2005 | Wang et al. |
| 2005/0108330 | A1 | 5/2005 | Sakaguchi et al. |
| 2006/0244624 | A1* | 11/2006 | Wang et al. ............... 340/815.67 |
| 2009/0109124 | A1* | 4/2009 | Han ................................ 345/1.3 |

FOREIGN PATENT DOCUMENTS

| CN | 1581187 A | 2/2005 |
| CN | 101072228 A | 11/2007 |
| CN | 100383774 C | 4/2008 |
| CN | 101165653 A | 4/2008 |
| CN | 101291251 A | 10/2008 |
| EP | 1450266 A1 | 8/2004 |

* cited by examiner

*Primary Examiner* — Jeong S Park
(74) *Attorney, Agent, or Firm* — Harness, Dickey & Pierce, P.L.C.

(57) ABSTRACT

A synchronous control method for multi-computer is provided. The multi-computer is connected with each other through a network. The method includes the following steps: maintaining a running information list on each computer in the network, where the identifier information of all computers and the running state information of the corresponding computers are contained in the running information list; receiving a synchronous control instruction inputted by a user at any of the computers in the network; executing the synchronous control operation on the computers recorded in the running information list when the running state information of the computer receiving the instruction accords with a predetermined rule.

4 Claims, 15 Drawing Sheets

SYSTEM AND METHOD TO SYNCHRONOUSLY DISPLAY 3D OBJECT INFORMATION ON PLURAL SCREENS OF PLURAL COMPUTERS

This application claims the priority to Chinese Patent Application No. 200810106253.1, filed with the Chinese Patent Office on Jan. 18, 2008 and entitled "Synchronous Control Method and System for plural computers", which is hereby incorporated by reference in its entirety.

FIELD OF THE INVENTION

The present invention relates to the field of a synchronous processing on plural computers and in particular to a synchronous control method and system for plural computers.

BACKGROUND OF THE INVENTION

It is commonly required in application fields of a distributed synchronous browse of products, a network based remote failure analysis, a medical consultation, etc., to connect plural computers over a network in order to perform synchronously a control operation. In the prior art, such synchronous control methods for plural computers are generally divided into the following two categories:

The first category involves a multi-computer synchronous browse control system in a client/server mode. A computer in such a system shall act as a server, and the other computers in the system shall communicate with the computer acting as the server in order for a desired synchronous control. Particularly, software executed on the computer acting as the server is different from that executed on the other computers, and the computer acting as the server shall be firstly initiated and remain constantly operative in order to ensure a normal operation of the system.

The second category involves a multi-computer synchronous browse control system in a peer mode. No specialized computer is required in this system to act as a server to control the other computers, but a control privilege of a master computer shall be set manually by a user, that is, a control request command shall be pre-executed by the user, and a corresponding computer can be set as the master computer for an operation control only upon permission; and correspondingly, if the master computer has to be replaced, firstly a control privilege abandon command of the current master computer shall be executed, and then a new control request command shall be executed again for a master computer which is newly set, and the master computer can be replaced only upon permission.

As can be apparent, the first approach in the prior art has the following drawbacks:

(1) Two different sets of software, i.e., server software and client software, have to be equipped for the same system, and this might unnecessarily result in an additional system overhead, a waste of resource and a raised cost;

(2) At least one specific computer (server) has to be firstly initiated and remain constantly operative in order to ensure a normal operation of the system, and this might also result in the problems of an additional system overhead, a waste of resource and a raised cost; and (3) A control operation of the master computer for enforcing a control has to be firstly sent to the server, which in turn forwards it to other computers of the system, and this might result in a delay of the control and a consequential slowed reaction of the system.

The second approach in the prior art has the following drawbacks:

Both acquisition and renouncing of the control privilege of the master computer has to be effected by the user executing a specific command, and this might be inconvenient to use and operate and frequently render the system appearing inoperative to the user and produce consequentially a poor user experience.

In general, it is currently desirable for those skilled in the art to address a technical issue of how to propose innovatively a synchronous control mechanism for plural computers in order for a simple and efficient synchronous control on the plural computers while offering a better user experience with a reduced system overhead, waste of resources and cost.

SUMMARY OF THE INVENTION

The invention is intended to address a technical issue of how to propose an synchronous control method and system for plural computers in order for a simple and efficient synchronous control on the plural computers while offering a better user experience with a reduced system overhead, waste of resources and cost.

In order to address the foregoing technical issue, embodiments of the invention provide the following technical solutions:

A synchronous control method for plural computers connected via a network includes:

maintaining on each of the computers in the network an operation information table including the identification information of each of the computers in the network and the operation status information of the corresponding computer;

receiving a synchronous control instruction input from a user to any of the computers in the network; and performing a synchronous control operation on a computer recorded in the operation information table if the operation status information of the computer receiving the instruction meets a preset rule.

Preferably, the operation status information includes peer status information, master status information or slave status information.

Preferably, the synchronous control instruction is a synchronous control trigger instruction, and the step of performing a synchronous control includes:

determining from the synchronous control trigger instruction whether the operation status information of the computer receiving the instruction is peer status information;

if the operation status information of the computer receiving the instruction is peer status information, changing the peer status information to master status information, and submitting a control privilege request message to other computers recorded in the operation information table; and receiving by the other computers the control privilege request message, and changing its operation status information to slave status information.

Preferably, the operation information table further includes a priority parameter, and the step of performing the synchronous control includes:

comparing the priority parameters of the computers receiving the instruction, and selecting one of the computers with the highest priority as the computer subject to the status determination step.

Preferably, the priority parameter is generated from the initiation time and the address information of each of the computers in the network.

Preferably, the step of performing the synchronous control further includes:

recording in the operation information table of each of the computers in the network the time that the computer with master status information sends the control privilege request message; and determining one of the computers with the earliest time that the control privilege request message is sent or with the same time that the control privilege request message is sent and with a higher priority parameter as a computer with master status information, and changing the operation status information of other corresponding computers to slave status information.

Preferably, the synchronous control instruction is a synchronous control operation instruction, and the step of performing the synchronous control further includes:

determining from the synchronous control operation instruction whether the operation status information of the computer receiving the instruction is master status information;

if the operation status information of the computer receiving the instruction is master status information, executing the instruction on the computer with master status information, and generating and sending a corresponding control operation request to a corresponding compute with slave status information; and performing by the computer with slave status information a corresponding operation in response to the control operation request.

Preferably, the method further includes:

if the computer with master status information has not received any synchronous control instruction within a preset threshold of time, changing master status information of the computer to peer status information, and sending a control privilege abandon message to a computer recorded in the operation information table with slave status information; and changing by the computer with slave status information the operation status information to peer status information in response to the control privilege abandon message.

An embodiment of the invention further discloses a synchronous control system for plural computers connected over a network, where the system includes:

an operation information table maintenance module adapted to maintain on each of the computers in the network an operation information table including the identification information of each of the computers in the network and the operation status information of the corresponding computer;

an instruction reception processing module adapted to receive a synchronous control instruction input from a user to any of the computers in the network; and a synchronous control operation module adapted to perform a synchronous control operation on a computer recorded in the operation information table if the operation status information of the computer receiving the instruction meets a preset rule.

Preferably, the operation status information includes peer status information, master status information or slave status information.

Preferably, the synchronous control instruction is a synchronous control trigger instruction, and the synchronous control operation module includes:

a peer status determination sub-module adapted to determine from the synchronous control trigger instruction whether the operation status information of the computer receiving the instruction is peer status information; and if the operation status information of the computer receiving the instruction is peer status information, adapted to trigger a change-to-master-status sub-module;

the change-to-master-status sub-module adapted to change the peer status information to master status information and to submit a control privilege request message to other computers recorded in the operation information table; and a change-to-slave-status sub-module adapted for the other computer to receive the control privilege request message and to change its operation status information to slave status information.

Preferably, the operation information table further includes a priority parameter, and the synchronous control operation module further includes:

a first priority determination sub-module adapted to compare the priority parameters of the computers receiving the instruction and to select one of the computers with the highest priority as the computer subject to the status determination step;

Preferably, the synchronous control operation module further includes:

a time record sub-module adapted to record in the operation information table of each of the computers in the network the time that the computer with master status information sends the control privilege request message; and a second priority determination sub-module adapted to determine one of the computers with the earliest time that the control privilege request message is sent or with the same time that the control privilege request message is sent and with a higher priority parameter as a computer with master status information and to change the operation status information of other corresponding computers to slave status information.

Preferably, the synchronous control instruction is a synchronous control operation instruction, and the synchronous control operation module further includes:

a master status determination sub-module adapted to determine from the synchronous control operation instruction whether the operation status information of the computer receiving the instruction is master status information; and if the operation status information of the computer receiving the instruction is master status information, adapted to trigger a current computer execution transmission sub-module;

the current computer execution transmission sub-module adapted to execute the instruction on the computer with master status information and to generate and send a corresponding control operation request to a corresponding computer with slave status information; and a synchronous operation sub-module adapted to cause the computer with slave status information to perform a corresponding operation in response to the control operation request.

Preferably, the system further comprises:

a status update module adapted to change master status information of the computer to peer status information when the computer with master status information has not received any synchronous control instruction within a preset threshold of time, to send a control privilege abandon message to a computer recorded in the operation information table with slave status information, and to cause the computer with slave status information to change its operation status information to peer status information in response to the control privilege abandon message.

An embodiment of the invention further discloses a 3D synchronous display method with plural computers and plural screens, wherein the plural computers are connected over a network and provided with display screens including a main window and sub-windows, and the method includes:

maintaining an operation information table on each of the computers connected over the network in response to an initiation message from a joining computer connected over the network, wherein the initiation message includes 3D object information and display angle-of-view information; the operation information table includes the IP address of each of the computers in the network and its operation status information; and the operation status information includes peer status information, master status information or slave status information;

loading respectively on the computers in the network load a 3D object in response to the initiation message, and drawing by each of the computers in its main window the 3D object according to the corresponding display angle-of-view information and also generating a sub-window in which the 3D object with a different angle-of-view of other computers in the network than the current computer is drawn;

receiving a 3D object trigger instruction submitted from a user to any of the computers in the network;

if the operation status information of the computer receiving the instruction is peer status information, changing the peer status information to master status information, and submitting a control privilege request message to other computers recorded in the operation information stable;

receiving by the other computer the control privilege request message, and changing its operation status information to slave status information;

receiving a 3D object operation instruction submitted from the user to the computer with master status information, and updating the drawings of the 3D object respectively in the main window and the sub-window of the current computer in response to the instruction; and generating from the drawing update operation a corresponding operation request and sending the corresponding operation request to a corresponding computer with slave status information, and updating by the computer with slave status information the drawings of the 3D object respectively in its corresponding main window and sub-window in response to the operation request.

Preferably, the operation information table further includes a priority parameter, and the method further includes:

comparing the priority parameters of the computers receiving the instruction, and selecting one of the computers with the highest priority as the computer subject to the status determination step.

Preferably, the priority parameter is generated from the initiation time and the address information of each of the computers in the network.

Preferably, the method further includes:

recording in the operation information table of each of the computers in the network the time that the computer with master status information sends the control privilege request message; and determining one of the computers with the earliest time that the control privilege request message is sent or with the same time that the control privilege request message is sent and with a higher priority parameter as a computer with master status information, and changing the operation status information of other corresponding computers to slave status information.

An embodiment of the invention further discloses a 3D synchronous display system with plural computers and plural screens, wherein the plural computers are connected over a network and provided with display screens including a main window and sub-windows, and the system includes:

an operation information table maintenance unit adapted to maintain an operation information table on each of the computers connected over the network in response to an initiation message from a joining computer connected over the network, wherein the initiation message includes 3D object information and display angle-of-view information; the operation information table includes the IP address of each of the computers in the network and its operation status information; and the operation status information includes peer status information, master status information or slave status information;

an initiation unit adapted to load a 3D object respectively on the computers in the network in response to the initiation message and to cause each of the computers to draw in its main window the 3D object according to the corresponding display angle-of-view information and also generate a sub-window in which the 3D object with a different angle-of-view of other computers in the network than the current computer is drawn;

a trigger instruction reception unit adapted to receive a 3D object trigger instruction submitted by a user to any of the computers in the network;

a change-to-master-status unit, if the operation status information of the computer receiving the instruction is peer status information, adapted to change the peer status information to master status information and to submit a control privilege request message to other computers recorded in the operation information stable;

a change-to-slave-status unit adapted to change the operation status information of the other computer to slave status information when the other computer receives the control privilege request message;

an operation instruction reception unit adapted to receive a 3D object operation instruction submitted from the user to the computer with master status information;

a master computer drawing update unit adapted to update the drawings of the 3D object respectively in the main window and the sub-window of the current computer in response to the operation instruction;

an update request unit adapted to generate from the drawing update operation a corresponding operation request and send the corresponding operation request to a corresponding computer with slave status information; and a slave computer drawing update unit adapted to cause the computer with slave status information to update the drawings of the 3D object respectively in its corresponding main window and sub-window in response to the operation request.

The invention has the following advantages over the prior art:

Firstly, the invention can implement a synchronous control operation process for plural computers in a simple peer computer network environment. With the invention, an operation information stable is set in each of the computers to divide dynamically the computers in the system into different statuses; and the respective computers in the system can enforce freely a confliction-free synchronous control on an object under control through a simple and effective communication protocol and in a definite protocol processing manner. The invention can be applied so as to run the same piece of software on the respective computers in the system without designating any computer as a special computer and without requiring any computer to be in an uninterrupted operation status so that the respective computers can join in or quit the system at any time. A user can operate the object under control without using any additional command inconsistent with a control operation, and it will be easy to use and operate while offering a good user experience with an effectively reduced system overhead, waste of resources and cost.

Secondly, the invention can judge the priorities of plural conflicting computers in practice to determine a unique master computer to perform a corresponding operation, which will be easy to operate while offering a better user experience without any additional resource waste or system overhead.

Lastly, the invention can be implemented technologically simply without any technical barrier and without any special cryptogram algorithm.

DETAILED DESCRIPTION OF THE INVENTION

The invention will be further detailed hereinafter with reference to the drawings and the embodiments in order to make the foregoing object, features and advantages of the invention more apparent and readily understood.

The invention can be applicable to a wide variety of general-purpose or application-specific computer system environment or configuration, e.g., a personal computer, a server computer, a handheld device or portal device, a flat panel device, a multi-processor system, a microprocessor-based system, a set top box, a programmable consumer electronic device, a network PC, a compact computer, a large computer, a distributed computing environment including any of the systems or devices, etc.

The invention can be described in a general context of computer executable instructions executed by a computer, e.g., a program module. Generally, the program module includes a routine, program, object, component, data structure, etc., which executes a specific task or implements a specific abstract type of data. The invention can also be put into practice in a distributed computing environment in which a task is executed by remote processing devices connected over a communication network. In the distributed computing environment, the program module can reside in a local or remote computer storage medium including a storage device.

An essential idea of the embodiments of the invention lies in that an operation information table maintained for and on each of plural computers connected over a network contains relevant information of all the computers, and when a user performs a synchronous control operation on any one of the computers, the operation information table on that computer is fetched, it is determined in response to an operation instruction and the operation status of the current computer whether a preset rule is meet, and the synchronous control operation is initiated if the preset rule is meet.

Figure 1:
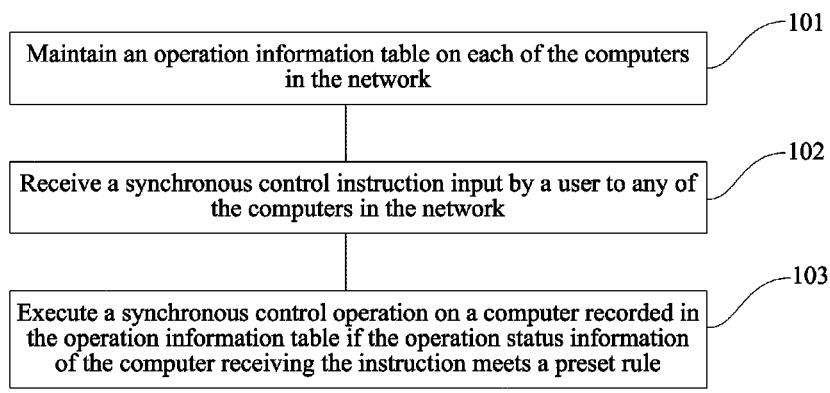
FIG. 1 is a flow chart of an embodiment of a synchronous control method for plural computers according to the invention.

Reference is made to FIG. 1 illustrating a flow chart of an embodiment of a synchronous control method for plural computers connected over a network according to the invention, which can particularly include the following steps:

Step 101. An operation information table is maintained on each of the computers in the network.

The operation information table can include the identification information of each of the computers in the network and the operation status information of the corresponding computer.

The network is commonly composed of plural computers (or other computer network devices) connected physically (or logically) over a transmission medium and software. Generally, a network of computers is primarily composed of four parts, i.e., computers, a network operating system, a transmission medium (tangible or intangible, e.g., air acting as a transmission medium of a radio network) and corresponding application software. The invention primarily concerns an improvement in the aspect of application software. In the invention, the network can be any one of a local area network, a metropolitan area network, a wide area network, the Internet, etc., and the plural computers can preferably be connected over the Ethernet. The computer identification information can be network address information.

In practice, the operation status information can include peer status information, master status information or slave status information, that is, an initiated computer in the network is in a peer, master or slave status, respectively. Each of the computers in the network is in any one of the three statuses, and only one computer is in a master status at a specific time. Stated differently, no more than one computer in a master status will be present at the same time. To this end, the invention further proposes a novel anti-confliction mechanism as will be described hereinafter in a relevant section.

Operations of maintaining the operation information table can particularly involve the following scenarios:

1. A computer initiated in the network sends an initiation message (e.g., information of the address, the initiation time, etc., of the current computer) to the other computers in the network in the form of a network broadcast message; and those of the computers in the network which have been initiated each respond to this message and establish a connection with the newly initiated computer, and then the operation information table is maintained on each of the initiated computers. Specifically:

It is determined from the identification information of the computer (e.g., the network address of the computer) whether an entry of the current computer has been present in the operation information table, and if an entry of the current computer has been present in the operation information table, then a new entry of the information table (e.g., the address and the initiation time of the current computer) and the original entry with the corresponding address is replaced with the new entry; otherwise, the new entry is added directly in the operation information table.

For a computer newly joining in the network, the operation statuses of the other computers in the network can be fetched to determine the operation status of the current computer. For example, the operation status of the current computer is set as a peer status if each of the other computers in the network is in a peer status; or the operation status of the current computer is set as a slave status if the current computer upon being initiated receives a control privilege request message sent from another computer in the network.

2. A computer quitting from the network sends a quit message to the other computers in the network in the form of a network broadcast message; and those of the computers in the network which have been initiated each respond to this message and take down a connection with the computer, and then the operation information table is maintained on each of the initiated computers. Specifically:

A corresponding entry in the operation information table for the quit requesting computer is removed according to the identification information of the computer; and the computer is reset to a peer status if its operation status prior to quitting is a master status.

3. The operation status information of the respective computers in the operation information table is updated in real time in response to a change of the operation status information of the respective computers in practice.

For example, a corresponding computer goes from a peer status to a master status, from a peer status to a slave status, from a master status to a slave status, etc., during a synchronous control or from a master status or a slave status to a peer status, etc., without any synchronous control operation for a period of time.

Of course, those skilled in the art can practically maintain the operation information table in any other manner as required in practice or by their experiences, and the foregoing methods are merely illustrative, and the invention shall not be limited in this regard.

Step 102. A synchronous control instruction is received which is input by a user to any of the computers in the network.

The synchronous control instruction can include a synchronous control trigger instruction and a synchronous control operation instruction. As can be appreciated, a non-synchronous control instruction merely intended to control an operation of a local computer can simply be processed on the local computer in an existing computer instruction processing manner.

Step 103. A synchronous control operation is executed on a computer recorded in the operation information table if the operation status information of the computer receiving the instruction meets a preset rule.

An essential idea of processing in the this step lies in that a computer in a peer status firstly initiating a synchronous control acquires a control privilege and acts as a master computer, and the other computers act as slave computers and are subject to a synchronous control process under the control of the master computer. To this end, further descriptions will be given hereinafter by illustrative way of several methods for executing a synchronous control operation. It shall be noted that as described in the invention, a peer status refers to being with peer status information, a master status refers to being with master status information, and a slave status refers to being with slave status information; and a master computer refers to a computer correspondingly with master status information, a slave computer refers to a computer correspondingly with slave status information, and a peer computer refers to a computer correspondingly with peer status information.

The First Method:

If the received synchronous control instruction is a synchronous control trigger instruction, a synchronous control operation can be executed in the following sub-steps:

Sub-step A1. It is determined from the synchronous control trigger instruction whether the operation status information of the computer receiving the instruction is peer status information;

Sub-step A2. If the operation status information of the computer receiving the instruction is peer status information, the peer status information is changed to master status information, and a control privilege request message is submitted to another computer recorded in the operation information table; and Sub-step A3. The other computer receives the control privilege request message and changes its operation status information to slave status information.

If the operation status information of the current computer is not peer status information, then it may be either master status information or slave status information. In practice, in the case of master status information, the synchronous control trigger instruction can be ignored, and a synchronous control operation instruction is awaited to be sent from the user. In the case of slave status information, the synchronous control trigger instruction can also be ignored, and the user is prompted regarding impossibility of any operation. Naturally, the foregoing operations are merely illustrative, and the invention shall not be limited in this regard.

Preferably, a change delay timer can be initiated when a peer status of a computer is changed to a master status to determine whether the change to a master status is timed out, and if the change to a master status is timed out, the change to a master status for the current computer is abandoned.

The Second Method:

In a peer status, it is possible that two or more computers may perform a local synchronous control trigger operation concurrently, and at this time a confliction may occur. Following the foregoing essential idea of processing in this step, only one of the computers can be enabled to act as a master computer under a rule upon confliction.

Specifically, if the received synchronous control instruction is a synchronous control trigger instruction, a priority parameter can be added in the operation information table, and a synchronous control operation can be executed in the following sub-steps:

Sub-step B1. The priority parameters of the computers receiving the instruction are compared, one of the computers with the highest priority is selected, and it is determined whether the operation status information of the computer is peer status information;

Sub-step B2. If the operation status information of the computer is peer status information, the peer status information is changed to master status information, and a control privilege request message is submitted to other computers recorded in the operation information table; and Sub-step B3. The other computer receives the control privilege request message and changes its operation status information to slave status information.

Preferably, the priority parameter can be generated from the initiation time and the address information of each of the computers in the network. For example, a higher priority parameter can be generated for a computer with an earlier initiation time or for a computer with a larger network address in the case of identical initiation times.

The Third Method:

In another practical situation with a confliction, a control privilege request message from a computer A firstly initiating a synchronous control trigger operation might arrive at another computer B at a later time than the time when the computer B initiates a synchronous control trigger operation due to a transmission delay of time resulting from a network transmission quality, etc., and then both of the computers might go to a master status and send a control privilege request message to other computers.

In this situation, a synchronous control operation can be executed in the following sub-steps:

Sub-step C1. It is determined from the synchronous control trigger instruction whether the operation status information of the computer receiving the instruction is peer status information;

Sub-step C2. If the operation status information of the computer receiving the instruction is peer status information, the peer status information is changed to master status information, and a control privilege request message is submitted to other computers recorded in the operation information table;

Sub-step C3. The other computers receive the control privilege request message and changes its operation status information to slave status information;

Sub-step C4. The time that the computer with master status information sends the control privilege request message is recorded in the operation status table of each of the computers in the network; and Sub-step C5. One of the computers with the earliest time that the control privilege request message is sent or with the same time that the control privilege request message is sent and with a higher priority parameter is determined as a computer with master status information, and the operation status information of other corresponding computers is changed to slave status information.

For example, a process of determining a master computer can be as follows:

Let T1 denote the time that a computer responds to a local synchronous control trigger instruction and T2 denote the time that a control privilege request message is received (that is, the time that a computer sending the control privilege request message responds to the local synchronous control trigger instruction);

In the case of T1<T2, which indicates that the time that the current computer triggers a synchronous control operation is earlier, the operation status information of the current computer is changed to master status information.

In the case of T1>T2, which indicates that the time that the remote computer sending the control privilege request message responds to a synchronous control is earlier, the operation status information of the remote computer is changed to master status information, and the operation status information of the current computer is changed to slave status information.

In the case of T1=T2, which indicates that the current computer responds to a synchronous control trigger operation at the same time as the remote computer sending the control privilege request message responds to the synchronous control trigger operation, the priority parameters of both of the computers are compared. If the priority parameter of the current computer is higher, the operation status information of the current computer is changed to master status information; or if the priority parameter of the remote computer is higher, the operation status information of the remote computer is changed to master status information, and the operation status information of the current computer is changed to slave status information.

In summary, for the situation with a confliction as illustrated in the second method, a corresponding anti-confliction mechanism is to cause the computer with the highest priority to acquire a control privilege and act as a master computer (i.e., acquire master status information) and the other computers to act as slave computers (i.e., acquire slave status information). For the situation with a confliction as illustrated in the third method, a corresponding anti-confliction mechanism lies in that each of the computers records the time that a synchronous control trigger operation is received from a user of the current computer in a peer status and contains that time in a control privilege request message sent to other computers. When a computer in a peer status receives plural control privilege request messages or a computer receives a control privilege request message from another computer, the times of the respective control privilege request messages can be compared to determine one of the computers acting as a master computer.

In practice, the foregoing methods may also be applicable to an anti-confliction handling method for a slave computer. As can be appreciated, a local computer can act as a slave computer because it has firstly responded to a control privilege request message sent from a computer in the network. The only situation of a source giving rise to a conflicting message is a control privilege request message sent from another computer in the network. Therefore, a confliction handling method can compare the times that the current master computer and a master computer which sends a control privilege request message respond respectively to a synchronous control trigger operation and their priority parameters and determine a new master computer under the same principle as the third method. If the current master computer is still a master computer as a result of the comparison, the current computer is still the slave computer of the current master computer, and the received control privilege request message is discarded. If the master computer sending the control privilege request message shall act as a master computer as a result of the comparison, the current computer acts as a slave computer of that master computer, and the information of the current master computer is replaced with the information of that master computer.

Correspondingly, the foregoing methods can also be applicable to an anti-confliction handling method for a peer computer. The only situation in which a computer in a peer status receives a conflicting message is concurrent reception of control privilege request messages sent from more than one computer in the network. Therefore, a confliction handling method can compare the times that the control privilege request messages are sent respectively in response to a synchronous control trigger operation and the priority parameters of the computers sending the messages to thereby determine a new master computer under the same principle as the third method.

The Fourth Method

It is typical to further execute a synchronous control operation after executing the synchronous trigger operation, and when a user inputs a synchronous control operation instruction to any of the computers in the network, then a corresponding synchronous control operation can include the following sub-steps:

Sub-step D1: It is determined from the synchronous control operation instruction whether the operation status information of the computer receiving the instruction is master status information;

Sub-step D2: If the operation status information of the computer receiving the instruction is master status information, the instruction is executed on the computer with master status information, and a corresponding control operation request is generated and sent to a corresponding computer with slave status information; and Sub-step D3: The computer with slave status information executes a corresponding operation in response to the control operation request.

If the operation status information of the current computer is not master status information, it may only be slave status information. In this case, error information can be returned to the user.

An application of a combination of the relevant steps in the foregoing first to fourth methods can readily occur to those skilled in the art and will fall into the scope of the invention, and detailed descriptions thereof will be omitted in the context for brevity.

In an embodiment of the invention, the following steps can be included:

If the computer with master status information has not received any synchronous control instruction within a preset threshold of time, master status information of the computer is changed to peer status information, and a control privilege abandon message is sent to a computer recorded in the operation information table with slave status information; and The computer with slave status information changes its operation status information to peer status information in response to the control privilege abandon message.

For example, a process of running the application software according to the invention can generally include the following steps:

Step S1: The software upon being initiated detects the composition of the system and sends an initiation message including the IP address, the initiation time, etc., of the current computer to other computers in the network in the form of a network broadcast message;

Step S2: A maintenance process on a system operation information table is performed. The message in the step S1 and the step S4 from other computers in the system is received and processed correspondingly.

For the initiation message in the step S1, if the IP address of the computer sending the message is absent in the system operation information table, a new information table entry is generated from the IP address and the initiation time of the initiation message; or if the IP address of the computer sending the message is present in the system operation information table, the contents of a corresponding entry in the information table is replaced with the IP address and the initiation time of the initiation message, and the table entry (corresponding to the computer sending the message) is assigned with a new priority. Then, an initiation response message is sent back to the computer sending the message.

For a quit message in the step S4, if the IP address of the message is present in the system information operation table, a corresponding entry in the system information operation table is removed, and a connection with the computer is taken down, and further if the computer sending the message is a master computer, it is reset to a master computer status, and the current computer goes to a peer status; or if the IP address of the message is absent in the system operation information table, the message is discarded.

Step S3: A synchronous control instruction input from a local user is received, and the following different processes can be performed respectively for a non-synchronous operation instruction, a synchronous control trigger instruction and a synchronous control operation instruction:

For a non-synchronous operation instruction, the flow goes to the step S4.

For a synchronous control trigger instruction, if the current computer is in a peer status, the current computer goes to a master status, and a change-to-master status delay timer is initiated, a control privilege request message (the message includes the IP address of the current computer and the time that the current computer receives the operation) is generated and sent to the respective computers, and the flow goes to the step S6. If the current computer is in a master status the status change timer is reset, and the flow goes to the step S5. If the current computer is in a slave status, the operation is abandoned, and the flow goes to the step S5.

For a synchronous control operation instruction, if the current computer is in a master status, a synchronous control message is sent to other computers, the status change timer is reset, and the flow goes to the step S6. If the current computer is in a slave status, the operation is abandoned, and the flow goes to the step S5.

Step S4: The non-synchronous operation instruction from the user is processed.

If an operation of the user concerns a command of quitting the system, a command of quitting the current computer is sent to the respective computers in the system while quitting the program. In the case of a command other than quitting the system, then the command is executed, and the flow goes to the step S5.

Step S5: The control message from other computers (the step S3) in the system is received, and the following different processes can be performed respectively for a control privilege request message, a synchronous control message and a control privilege abandon message:

(1) Control Privilege Request Message:

A. When the current computer is in a peer status: the current computer goes to a slave status upon reception of a control privilege request message from other computers, the computer sending the message is a master computer, and the time of the control privilege request message from the master computer and the priority parameter of the master computer is stored; or upon concurrent reception of control privilege request messages from plural other computers, the current computer determines a confliction for the times and the priority parameters of these control privilege request messages in a manner of comparing the times of the control privilege request messages of the computers and determining the time-earliest one of the computers with different times of control privilege requests or the priority-highest one of the computers with identical times of control privilege requests as a master computer. After the master computer is determined, the time of the control privilege request message from the master computer and the priority parameter of the master computer are stored. The flow goes to the step S2.

B. When the current computer is in a master status: determination of a confliction is performed for the time and the priority parameter of a control privilege request message against those of the current computer, a new master computer is determined (as in the step A), the time of the control privilege request message from the master computer and the priority parameter of the master computer is stored, and if the new master is not the current computer, the current computer goes to a slave status, and the change-to-master-status delay timer is disabled. The flow goes to the step S2.

C. When the current computer is in a slave status: determination of a confliction is performed for the synchronous control time and the priority parameter of a control privilege request message against those of the current computer (as in the step A), a new master computer is determined, and the time of the control privilege request message from the new master computer and the priority parameter of the new master computer is stored, and the current computer is still in a salve status. The flow goes to the step S2.

(2) Synchronous Operation Message: Only a computer in a slave status will receive a synchronous operation message and extract a synchronous control command from the synchronous operation message, and the flow goes to the step S6.

(3) Control Privilege Abandon Message: Only a computer in a slave status will receive a control privilege abandon message and clear the time of the control privilege request message from the current computer and the priority parameter of the current computer, and the current computer goes to a peer status. The flow goes to the step S2.

Step S6: The synchronous operation instruction from the user is processed. The local user synchronous control command from the step S3 and the synchronous control message command from the step S5 are converted into a control operation, and a synchronous operation processing on the current computer is performed. The flow goes to the step S7.

Step S7: A master status quit message is processed. If the current computer is in a peer status or a slave status, the flow goes to the step S2. Otherwise, it is determined whether the change-to-master-status delay timer is timed out, and if the change-to-master-status delay timer is timed out, the current computer goes to a peer status, the change-to-master-status delay timer is disabled, and a control privilege abandon message is sent to other computers in the system. The flow goes to the step S2.

As can be apparent, the invention can implement a synchronous control operation process for plural computers in a simple peer computer network environment. An operation information stable is set in each of the computers to divide dynamically the computers in the system into different statuses; and the respective computers in the system can enforce freely a confliction-free synchronous control on an object under control through a simple and effective communication protocol and in a definite protocol processing manner. Therefore, the invention can run the same piece of software on the respective computers in the system without designating any computer as a special computer and without requiring any computer to be in an uninterrupted operation status so that the respective computers can join in or quit the system at any time. A user can operate the object under control without using any additional command inconsistent with a control operation, and it will be easy to use and operate.

Figure 2:
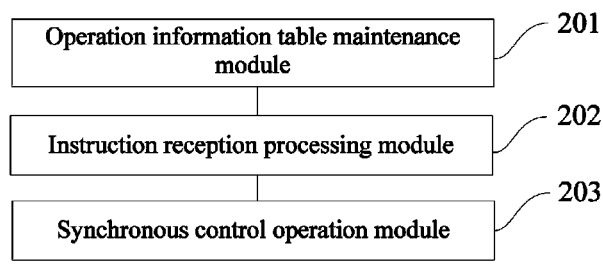
FIG. 2 is a structural block diagram of an embodiment of a synchronous control system for plural computers according to the invention.

Reference is made to FIG. 2 illustrating a structural block diagram of an embodiment of a synchronous control system for plural computers connected over a network according to the invention, which can include:

An operation information table maintenance module 201 adapted to maintain on each of the computers in the network an operation information table including the identification information of each of the computers in the network and the operation status information of the corresponding computer;

An instruction reception processing module 202 adapted to receive a synchronous control instruction input from a user to any of the computers in the network; and A synchronous control operation module 203 adapted to perform a synchronous control operation on a computer recorded in the operation information table if the operation status information of the computer receiving the instruction meets a preset rule.

Preferably, the operation status information can include peer status information, master status information or slave status information.

In an embodiment of the invention, the synchronous control instruction is a synchronous control trigger instruction, and the synchronous control operation module can include:

A peer status determination sub-module adapted to determine from the synchronous control trigger instruction whether the operation status information of the computer receiving the instruction is peer status information; and if the operation status information of the computer receiving the instruction is peer status information, adapted to trigger a change-to-master-status sub-module;

The change-to-master-status sub-module adapted to change the peer status information to master status information and to submit a control privilege request message to other computers recorded in the operation information table; and A change-to-slave-status sub-module adapted for the other computer to receive the control privilege request message and to change its operation status information to slave status information.

In another embodiment of the invention, the operation information table can further include a priority parameter, the computer receiving the instruction involves plural computers receiving the instruction concurrently, and the synchronous control operation module includes:

A first priority determination sub-module adapted to compare the priority parameters of the computers receiving the instruction and to select one of the computers with the highest priority as the computer subject to the status determination step;

A peer status determination sub-module adapted to determine from the synchronous control trigger instruction whether the operation status information of the computer receiving the instruction is peer status information; and if the operation status information of the computer receiving the instruction is peer status information, adapted to trigger a change-to-master-status sub-module;

The change-to-master-status sub-module adapted to change the peer status information to master status information and to submit a control privilege request message to other computers recorded in the operation information table; and A change-to-slave-status sub-module adapted for the other computer to receive the control privilege request message and to change its operation status information to slave status information.

In another embodiment of the invention, the synchronous control operation module includes:

A peer status determination sub-module adapted to determine from the synchronous control trigger instruction whether the operation status information of the computer receiving the instruction is peer status information; and if the operation status information of the computer receiving the instruction is peer status information, adapted to trigger a change-to-master-status sub-module;

The change-to-master-status sub-module adapted to change the peer status information to master status information and to submit a control privilege request message to other computers recorded in the operation information table;

A change-to-slave-status sub-module adapted for the other computer to receive the control privilege request message and to change its operation status information to slave status information;

A time record sub-module adapted to record in the operation information table of each of the computers in the network the time that the computer with master status information sends the control privilege request message; and A second priority determination sub-module adapted to determine one of the computers with the earliest time that the control privilege request message is sent or with the same time that the control privilege request message is sent and with a higher priority parameter as a computer with master status information and to change the operation status information of other corresponding computers to slave status information.

In the present embodiment, the synchronous control instruction is a synchronous control operation instruction, and the synchronous control operation module can further include:

A master status determination sub-module adapted to determine from the synchronous control operation instruction whether the operation status information of the computer receiving the instruction is master status information; and if the operation status information of the computer receiving the instruction is master status information, adapted to trigger a current computer execution transmission sub-module;

The current computer execution transmission sub-module adapted to execute the instruction on the computer with master status information and to generate and send a corresponding control operation request to a corresponding computer with slave status information; and A synchronous operation sub-module adapted to cause the computer with slave status information to perform a corresponding operation in response to the control operation request.

Preferably, an embodiment of the invention can further include:

A status update module adapted to change master status information of the computer to peer status information when the computer with master status information has not received any synchronous control instruction within a preset threshold of time, to send a control privilege abandon message to a computer recorded in the operation information table with slave status information, and to cause the computer with slave status information to change its operation status information to peer status information in response to the control privilege abandon message.

Since the embodiments of the system illustrated in FIG. 2 can correspond to the embodiments of the method illustrated in FIG. 1, they have been described in brief, and reference can be made to the descriptions of the embodiments of the invention for relevant details.

Science computation visualization, an emerging technology which emerged in late 1980's along with booming computer technologies, converts various complex data into intuitive graphics or images to facilitate proper understanding of what the data or process conveys. It is primarily intended to more effectively process and analyze increasing science and engineering data and to provide scientific researcher and engineers with a tool of exploring and studying effectively and intuitively an objective world. During the early development phase of science computation visualization, computer hardware was costly and limited in performance. The visualization technology at that time was primarily focused on the research of a high definition and large field of vision display. During this phase, some foreign companies develop top-level and specialized visualization systems equipped with specialized software by means of their advanced hardware manufacturing technologies, and these systems presented an incomparable display performance at that time. Unfortunately, they were too expensive to be widely applied. As the computer technologies develop, their gradually lower hardware cost and constantly improved performance have significantly fueled the development of science computation visualization.

High-level applications of science computation visualization primarily relate to a 3D synchronous display with plural computers and plural screens, which at present has been widely applied in a distributed synchronous browse of products, a network based remote failure analysis, a medical consultation, etc. In short, such a 3D synchronous display with plural computers and plural screens is intended to enforce a synchronous display control on the same 3D object on plural computers connected over a network.

Figure 3:
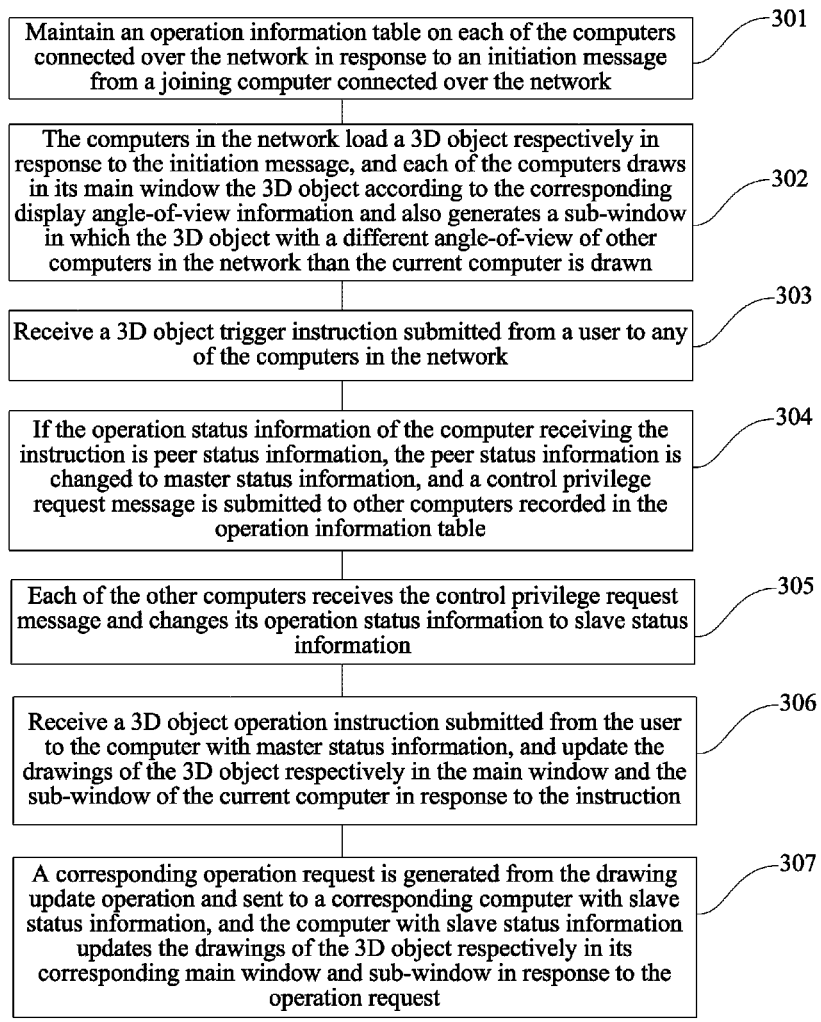
FIG. 3 is a flow chart of an embodiment of a 3D synchronous display method with plural computers and plural screens implemented based upon the essential idea of the invention.

Reference is made to FIG. 3 illustrating a flow chart of an embodiment of a 3D synchronous display method with plural computers and plural screens implemented based upon the essential idea of the invention, where the plural computers are connected over a network and provided with display screens including a main window and sub-windows. The present embodiment can include the following steps:

Step 301. An operation information table is maintained on each of the computers connected over the network in response to an initiation message from a joining computer connected over the network;

Particularly, the initiation message includes 3D object information and display angle-of-view information; the operation information table includes the IP address of each of the computers in the network and its operation status information; and the operation status information includes peer status information, master status information or slave status information;

Step 302. The computers in the network load a 3D object respectively in response to the initiation message, and each of the computers draws in its main window the 3D object according to the corresponding display angle-of-view information and also generates a sub-window in which the 3D object with a different angle-of-view of other computers in the network than the current computer is drawn;

Step 303. A 3D object trigger instruction is received which is submitted from a user to any of the computers in the network;

Step 304. If the operation status information of the computer receiving the instruction is peer status information, the peer status information is changed to master status information, and a control privilege request message is submitted to other computers recorded in the operation information stable;

Step 305. Each of the other computers receives the control privilege request message and changes its operation status information to slave status information;

Step 306. A 3D object operation instruction is received which is submitted from the user to the computer with master status information, and the drawings of the 3D object are updated respectively in the main window and the sub-window of the current computer in response to the instruction;

Step 307. A corresponding operation request is generated from the drawing update operation and sent to a corresponding computer with slave status information, and the computer with slave status information updates the drawings of the 3D object respectively in its corresponding main window and sub-window in response to the operation request.

In a peer status, a computer firstly initiating a synchronous control acquires a control privilege and acts as a master computer, and the other computers act as slave computers and are subject to a synchronous control process under the control of the master computer. However, in a peer status, it is possible that two or more computers may perform a local synchronous control trigger operation concurrently, and at this time a confliction may occur. In order to avoid a confliction by enabling one of the computers to act as a master computer, the present embodiment can further arrange a priority parameter in the operation information table, and then an anti-confliction method can include the following additional steps in the present embodiment:

The priority parameters of the computers receiving the instruction are compared, and one of the computers with the highest priority is selected as the computer subject to the status determination step.

Reference can be made to the second method in the foregoing embodiments of the synchronous control method for plural computers for descriptions of this step which will be omitted here.

Preferably, the priority parameter is generated from the initiation time and the address information of each of the computers in the network.

In practice, another anti-confliction method can include the following additional steps in the present embodiment:

The time that the computer with master status information sends the control privilege request message is recorded in the operation information table of each of the computers in the network; and One of the computers with the earliest time that the control privilege request message is sent or with the same time that the control privilege request message is sent and with a higher priority parameter is determined as a computer with master status information, and the operation status information of other corresponding computers is changed to slave status information.

Reference can be made to the third method in the foregoing embodiments of the synchronous control method for plural computers for descriptions of this step which will be omitted here.

In practice, the present embodiment can be implemented on high performance PC computers connected over the Ethernet to display the same 3D data model with different angles-of-view concurrently on the respective computers, and a user can perform loading and browsing operations of the 3D object on any of the computers while putting the other computers under the control of that computer to thereby enable the function of performing synchronous loading and browsing operations on the same 3D object.

The operation status information in the present embodiment identifies three different statuses respectively, i.e., a peer status, a master status and a slave status. When a computer is in one of the three statuses, it can be referred to as a peer status computer, a master computer and a slave computer. At a specific time, a computer can be in only one of the three statuses, and only one computer can be a master computer.

The computers in the network can be distinguished from each other by their unique IP addresses, and each of the computers can be provided with a different priority which is also unique.

Typically, a method for browsing operation on a 3D object includes:

Rotation Operation: A mouse is dragged in different directions while pressing its left key in a non-translational status.

Translation Operation: A mouse is dragged in different directions while pressing its left key in a translational status.

Magnification operation: The middle key of a mouse is scrolled backward.

Minification operation: The middle key of a mouse is scrolled forward.

Display-Reset Operation: The right key of a mouse is clicked on (a display object will resume the position where it was displayed upon initial loading thereof).

3D Object Data Load Operation: A designated 3DS data file is opened.

Control operations of a user on a computer can be divided based upon the foregoing operations into three categories of a synchronous control trigger operation, a synchronous control operation and a non-synchronous control operation. The synchronous control trigger operation can include loading 3D object data, rotating, translating, magnifying, minifying, display-resetting, etc., a loaded 3D object; the synchronous control operation can include rotating, translating, magnifying, minifying, etc., a loaded 3D object; and the non-synchronous control operation can include setting the color of a background of the current computer, changing the angle of view of the current computer, etc. The synchronous control operation is a process to be performed synchronously by the respective computers, the synchronous control trigger operation is an operation causing the user to perform a synchronous operation on a computer in a peer status and may possibly cause the computer to change from a peer computer to a master computer; and the non-operation is a process to be performed by a computer on itself.

Computer instruction operation processes in respective statuses will be described hereinafter:

1. Peer Status:

If each of the computers in the network is in a peer status upon initiation of software, the current computer will be in a peer status.

In a peer status, the computer will act as a master computer if a user performs the following synchronous control trigger operation on the computer. The synchronous control trigger operation can include the following system messages:

Left-key-of-mouse press message

Right-key-of-mouse press message

Middle key-of-mouse scroll message

Menu-of-3DS-files load message

The computer acting as a master computer sends to other computers in the network a control privilege request message including the time that the current computer responds to the synchronous control trigger operation and the priority parameter of the current computer. Upon reception of the control privilege request message, the other computer changes from a peer status to a slave status and stores the received time of the control privilege request message and priority parameter of the master computer for determination of a confliction.

Processing methods for and status change operations of respective messages in a peer status can particularly be as follows:

(1) A synchronous control trigger operation of a user of the current computer is received.

A process is that the current computer goes to a master status and sends a control privilege request message to other computers.

(2) A control privilege request message from the other computers is received.

A process is that upon reception of a control privilege request message from another individual computer, the current computer goes to a slave status and stores the time of the control privilege request message of the master computer and the priority parameter of the master computer; or that upon reception of control privilege request messages from plural other computers, determination of a confliction is performed for the synchronous control times and the priority parameters of these control privilege request messages, a master computer is determined, and the time of the control privilege request message of the master computer and the priority parameter of the master computer are stored.

(3) An initiation message from another computer is received.

A process is that a control privilege request message is sent to the computer, and the current computer remains in a peer status.

(4) A quit message from another computer is received.

A process is that a connection with the computer is taken down, and the current computer remains in a peer status.

2. Master Status:

A user can perform a synchronous control operation on a computer after the computer acts as a master computer. During the synchronous control operation, the master computer sends a control message to respective slave computers over the network. The respective slave computers respond to the synchronous control message and perform a corresponding synchronous control process in response to the message to thereby enable a synchronous browse function.

When the user terminates the synchronous control operation, the master computer can initiate a status change timer to commence time counting. The synchronous control operation can include the following system messages:

During a rotational browse: left-key-of-mouse release message

During a translational browse: left-key-of-mouse release message

During a zoom browse: middle-key-of-mouse scrolling termination message

During display-resetting: right-key-of-mouse release message

During loading of a 3DS file: if a status change period (typically 0.5 second) expires after successfully opening and fetching the 3DS file, the master computer quits a master status, goes to a peer status and sends a control privilege abandon message to respective slave computers. The respective slave computers discard the stored time of the control privilege request of the master computer and priority parameter of the master computer upon reception of the control privilege abandon message.

If the user initiates again a synchronous control trigger operation within the status change period of the timer, the master computer resets the status change timer, performs a corresponding synchronous control process and sends a control message to the respective slave computers. The master computer continues with being in a master status.

Processing methods for and status change operations of respective messages in a master status can particularly be as follows:

(1) A synchronous control trigger operation or a synchronous control operation of a user of the current computer is received.

A process is that a corresponding synchronous control process is performed, a synchronous control message is sent to the respective slave computers, and the status change timer is reset.

(2) The status change timer is timed out.

A process is that a control privilege abandon message is sent to the respective slave computers while quitting a master status and going to a peer status.

(3) A control privilege request message from another computer is received.

A process is that determination of a confliction is performed for the synchronous control time and the priority parameter of the control privilege request message with those of the current master computer, a new master computer is determined, and corresponding anti-confliction handling is performed (reference can be made to the relevant descriptions of the second and third methods in the foregoing multi-computer synchronous control embodiments for details of a method for the anti-confliction handling, repeated descriptions of which will be omitted here).

(4) A program initiation message from another computer is received.

A process is that a control privilege request message is sent to the computer, and the current computer remains in a master status.

(5) A quit message from another computer is received.

A process is that a connection with the computer is taken down, and the current computer remains in a master status.

3. Slave Status:

When a computer initiates the software, each of the other computers in the network will send an initialization message to that computer, and if there is already a master computer in the network, the current computer will act as a slave computer. The current computer will also determine from the received initialization message its priority and angle of view at which a 3D model is displayed. A computer in a peer status will also go to a salve status and act as a slave computer upon reception of a control privilege request message.

A slave computer responds to a synchronous control command sent from a master computer and controls the current computer to perform the same synchronous control process as the master computer. A slave computer will not respond to any synchronous control trigger operation of a user of the current computer. A slave computer will discard the stored time of the control privilege request message of a master computer and priority of the master computer and then go to a peer status upon reception of a control privilege abandon message from a master computer.

A slave computer can respond to a non-synchronous control operation of a user of the current computer and perform a corresponding process.

Processing methods for and status change operations of respective messages in a slave status can particularly be as follows:

(1) A synchronous control trigger operation or a synchronous control operation of a user of the current computer is received.

A process is that no process is performed while remaining in a slave status.

(2) A control privilege request message from another computer is received.

A process is that determination of a confliction is performed for the synchronous control time and the priority parameter of the control privilege request message with those of the current master computer, a new master computer is determined, and a corresponding process is performed. The current master computer remains in a slave state (Reference can be made to the relevant descriptions of the second and third methods in the foregoing multi-computer synchronous control embodiments for details of a method for anti-confliction handling, repeated descriptions of which will be omitted here).

(3) A control privilege abandon message from another computer is received.

A process is that the time of the control privilege request message of the current master computer and the priority of the master computer are discarded while going to a peer status.

(4) A program initiation message from another computer is received.

A process is that a control privilege request message is sent to the computer, and the current computer remains in a slave status.

(5) A quit message from another computer is received.

A process is that a connection with the computer is taken down, and the current computer remains in a slave status.

In an embodiment, a 3D object can be drawn in response to a synchronous control operation instruction submitted from a user in an OpenGL drawing manner. OpenGL stands for "Open Graphics Library". As the name implies, OpenGL refers to an "open graphics program interface", and it is an open development standard of three-dimension graphics established jointly by several major computer companies, which is a well-defined standard of three-dimension graphics at present. OpenGL is a hardware independent interface, and it is independent of a window system, an operating system and a hardware system and can be applicable to a variety of hardware platforms. OpenGL can also be applicable in various network environments so that an OpenGL command is run and distributed at a client and received and executed at a server. OpenGL which is a software interface of graphics hardware possesses a variety of functions with which various prototypes of a two-dimension or three-dimension object can be created and various operations can be performed on the object, including a description of the profile of the object, model transformation, point-of-view transformation, coordinate transformation, light effect processing, color setting, texture supporting, tailoring, bitmap processing, anti-aliasing and various effect enhancing processes.

For example, an OpenGL drawing process can include:

Step E1. A device context is created for a display window;

Step E2. An OpenGL render context is generated from the device context;

Step E3. The OpenGL render context and the device context are associated;

Step E4. An instruction input from a user is parsed into a drawing command in an environment of the OpenGL context;

Step E5. Respective display windows are drawn sequentially in response to the drawing command;

Step E6. A target display window for drawing is determined, and the environment of the OpenGL context of that display window is set as the current environment of the OpenGL context;

Step E7. The drawing command is executed in the current environment of the OpenGL context to accomplish drawing;

Step E8. The environment of the OpenGL context is released; and

Step E9. The next target display window for drawing (e.g., a sub-window) is triggered.

Stated differently, firstly a device context is acquired, then an OpenGL render context hGLRC is generated from the device context using the OpenGL function wglCreateContext; and then wglMakeCurrent is invoked to associate the generated render context hGLRC with the device context hDC.

For example, OpenGL device environments are created respectively for a main window and sub-windows. Particularly, an OpenGL display process of a main window can be performed based upon an SDI application framework, and an OpenGL initialization process of the main window can be performed in the function OnCreate( ) of an SDI window class, including, for example, creating a desired pixel format, acquiring an index value of pixel mode in a designated device environment, declaring hereby a pixel mode, etc.; and then an OpenGL render context is generated from a device context associated with the current window using the function wglCreateContext( ), the generated OpenGL render context and the device context are associated using wglMakeCurrent( ) and the context environment of the main window (a 3D display of the main window) is set as the current OpenGL context environment.

A 3D display of sub-windows can be implemented by associating windows corresponding to a previously created modality-free dialog box respectively with newly created OpenGL render contexts. An OpenGL process of initializing the sub-windows is similar to the foregoing initialization process of the main window except that it is performed in the function OnCreate( ) of the dialog box.

Once an instruction input from a user, e.g., a browse instruction input from the user through various input devices, is received, the instruction can be parsed into a drawing command in the three-dimension display context environment. For example, the user performs an operation of moving a mouse in different browse modes, and upon reception of an instruction from the user to move the mouse, the system sets OpenGL drawing parameters in the current browse mode and then sends a drawing update message.

For example, a main window can be drawn in the function OnDraw( ) and each of sub-windows can be drawn in the corresponding function OnPaint( ) based upon an OpenGL context environment of the main window and the sub-window. On drawing each of windows, firstly the window can be provided with an OpenGL context environment from the function wglMakeCurrent(Hdc, hrc), where Hdc is a handle of a device context of the current window, and hrc is a handle of an OpenGL drawing context appropriate to the current window, which is created using the function wglCreateContext(Hdc). On completion of all the OpenGL drawings of the current window, the OpenGL context environment can further be released using the function wglMakeCurrent(NULL, NULL).

Upon completion of drawing the main window, a drawing message is sent to the first sub-window using SendMessage, and the sub-window is subject to the similar drawing process to the main window upon reception of the drawing message and sends a drawing message to the next sub-window upon completion of the drawing thereof, and so on.

Upon completion of drawing the last sub-window, a drawing completion message is sent to the main window using SendMessage. If the drawing procedure has not been completed at that time, then the main window will initiate the next round of drawing; or if the drawing procedure has been completed, the main window will not perform any more new drawing, and the system will return to a status of awaiting an instruction from the user.

Of course, those skilled in the art can adopt any drawing method by their experiences or as required, and the invention will not be limited in this regard.

It shall be noted that the foregoing embodiments of the method have been described as a series of combinations of actions for convenience of the descriptions, but those skilled in the art shall appreciate that the invention will not be limited to the described sequence of actions because some of the steps can be performed in a different sequence or concurrently according to the invention. Moreover, those skilled in the art shall also appreciate that the embodiments described in the specification belong to preferred embodiments and that the actions and modules related thereto will not be necessarily required for the invention.

Figure 4:
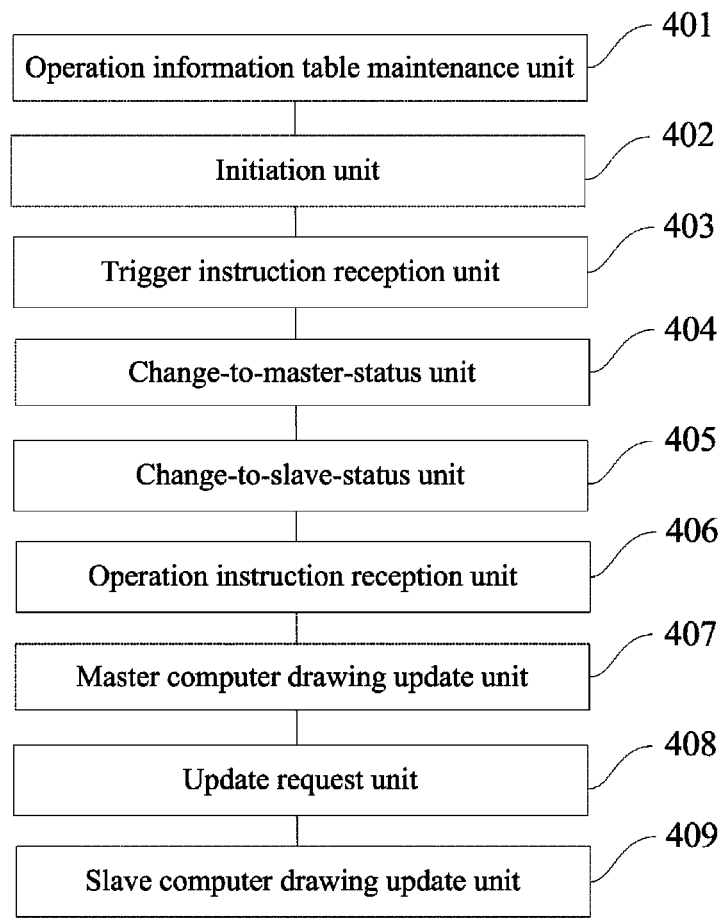
FIG. 4 is a structural block diagram of an embodiment of a 3D synchronous display system with plural computers and plural screens according to the invention.

Reference is made to FIG. 4 illustrating a structural block diagram of an embodiment of a 3D synchronous display system with plural computers and plural screens according to the invention, where the plural computers are connected over a network and provided with display screens including a main window and sub-windows. The system can include the following units:

An operation information table maintenance unit 401 adapted to maintain an operation information table on each of the computers connected over the network in response to an initiation message from a joining computer connected over the network;

Particularly, the initiation message includes 3D object information and display angle-of-view information; the operation information table includes the IP address of each of the computers in the network and its operation status information; and the operation status information includes peer status information, master status information or slave status information;

An initiation unit 402 adapted to load a 3D object respectively on the computers in the network in response to the initiation message and to cause each of the computers to draw in its main window the 3D object according to the corresponding display angle-of-view information and also generate a sub-window in which the 3D object with a different angle-of-view of other computers in the network than the current computer is drawn;

A trigger instruction reception unit 403 adapted to receive a 3D object trigger instruction submitted by a user to any of the computers in the network;

A change-to-master-status unit 404, if the operation status information of the computer receiving the instruction is peer status information, adapted to change the peer status information to master status information and to submit a control privilege request message to other computers recorded in the operation information table;

A change-to-slave-status unit 405 adapted to change the operation status information of the other computer to slave status information when the other computer receives the control privilege request message;

An operation instruction reception unit 406 adapted to receive a 3D object operation instruction submitted from the user to the computer with master status information;

A master computer drawing update unit 407 adapted to update the drawings of the 3D object respectively in the main window and the sub-window of the current computer in response to the operation instruction;

An update request unit 408 adapted to generate from the drawing update operation a corresponding operation request and send the corresponding operation request to a corresponding computer with slave status information; and A slave computer drawing update unit 409 adapted to cause the computer with slave status information to update the drawings of the 3D object respectively in its corresponding main window and sub-window in response to the operation request.

Preferably, the operation information table can further include a priority parameter, and the present embodiment can further include a first priority determination unit adapted to compare the priority parameters of the computers receiving the instruction and to select one of the computers with the highest priority as the computer subject to the status determination step.

Particularly, the priority parameter can be generated from the initiation time and the address information of each of the computers in the network.

Preferably, the following units can further be included in the present embodiment:

A time record unit adapted to record in the operation information table of each of the computers in the network the time that the computer with master status information sends the control privilege request message; and A second priority determination unit adapted to determine one of the computers with the earliest time that the control privilege request message is sent or with the same time that the control privilege request message is sent and with a higher priority parameter as a computer with master status information and to change the operation status information of other corresponding computers to slave status information.

The invention will be further described hereinafter by illustrative way of a particular 3D synchronous display operation process with plural computers and plural screens.

1. Initiation of Handling Process:

1) No message is received from any other initiated computer upon initiation: A blank display is remained until a user opens a 3D object, and then a display at a default angle of view is presented.

It is assumed that the system will be run on three computers, A, B and C, in a network, each of which is provided with a display area arranged in a way that a part of the area on the right occupying a proportion (e.g., a fifth) of a screen is a sub-window area to display the screen displayed at a computer initiated in the system and that the left part is a 3D display area of the current computer.

Figure 5:
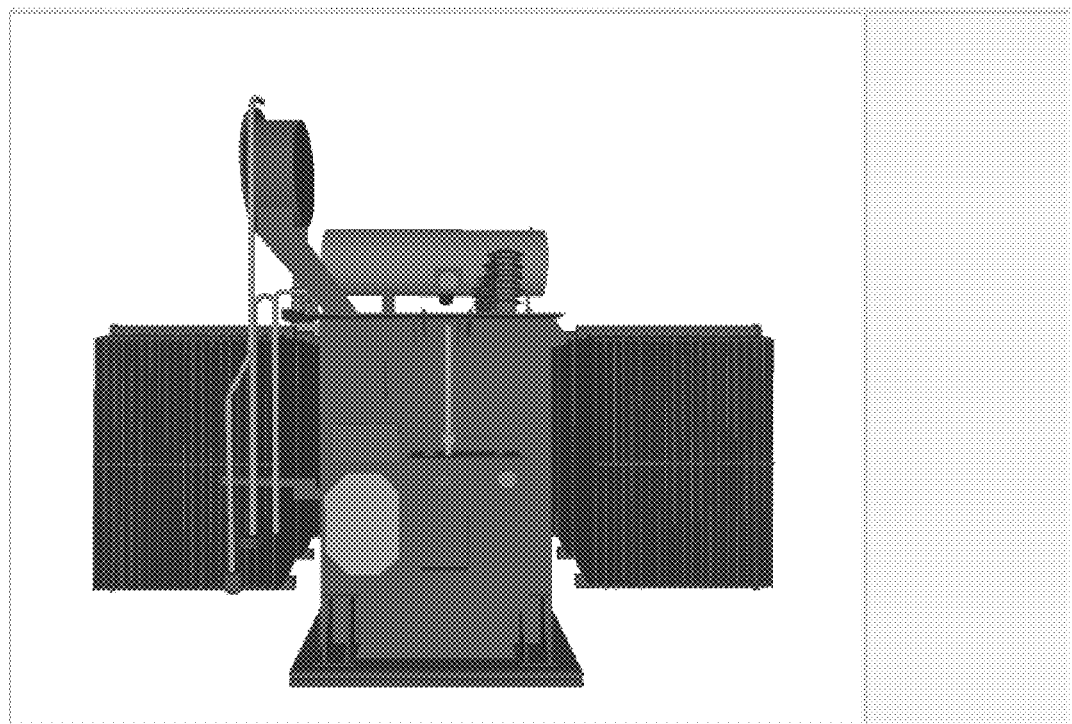
FIG. 5 is a schematic diagram 1 of a display in an embodiment of the 3D synchronous display system with plural computers and plural screens in an application of the invention.

This step is performed so that firstly the computer A is initiated and a 3D object is opened without reception of an initiation message from any other computer and thus the sub-window is blank. At this time, a schematic diagram of the display of the computer A is as illustrated in FIG. 5 in which the main window of the computer A displays a front view of the 3D object and there is no sub-window.

2) An initiation message is received from another computer upon initiation: A 3D object designated by the initiation message is opened and displayed at a local default angle of view; a sub-window corresponding to the initiated computer is created, and the 3D object is displayed at an angle of view of the initiated computer in the sub-window; and the main window and the sub-window are displayed blank if the initiated computer has not yet opened the 3D object.

Figure 6:
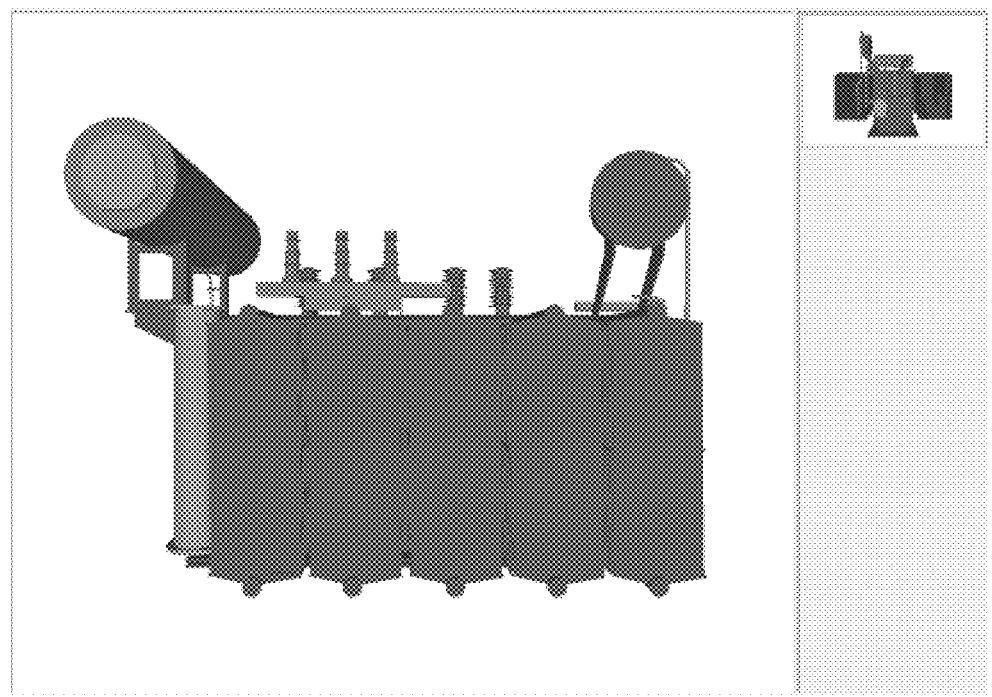
FIG. 6 is a schematic diagram 2 of a display in an embodiment of the 3D synchronous display system with plural computers and plural screens in an application of the invention.
Figure 7:
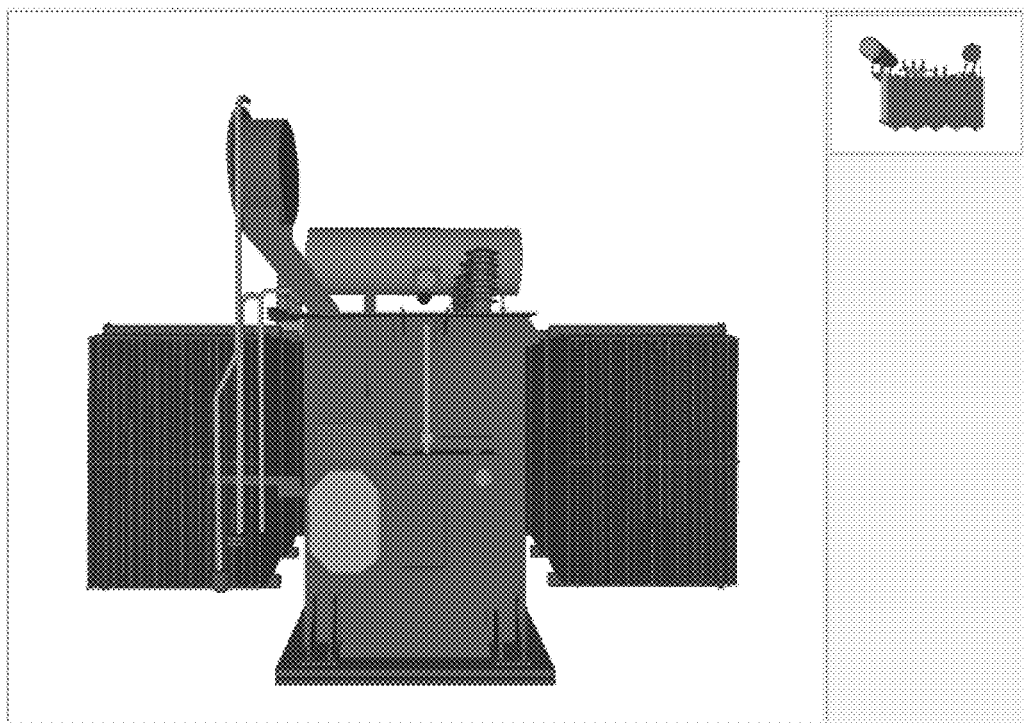
FIG. 7 is a schematic diagram 3 of a display in an embodiment of the 3D synchronous display system with plural computers and plural screens in an application of the invention.

Stated differently, if the computer B runs the system thereon and receives a response message from the computer A, the computer B loads automatically the 3D object opened at the computer A and displays it at a default angle of view and also draws a sub-window corresponding to the computer A. At this time, a schematic diagram of the display of the computer B is as illustrated in FIG. 6 in which the main window of the computer B displays a left side view of the 3D object and a sub-window displays a front view corresponding to the main window of the computer A. In this case, A receives an initiation message from B and draws a sub-window corresponding to the computer B in response to the message. At this time, a schematic diagram of the display of the computer A is as illustrated in FIG. 7 in which the main window of the computer A displays a front view of the 3D object and a sub-window displays a left side view corresponding to the main window of the computer B. As can be apparent from the figures, the computer A and the computer B each have one sub-window, and the 3D display angle of view differs from one computer to another.

3) An initiation message is received from another computer after initiation: the angle of view of the computer is acquired from the initiation message thereof, and a new sub-window is created. If the 3D object has been opened in the system, the 3D object is displayed at the angle of view of the computer in the sub-window; otherwise, the sub-window is displayed blank.

Figure 8:
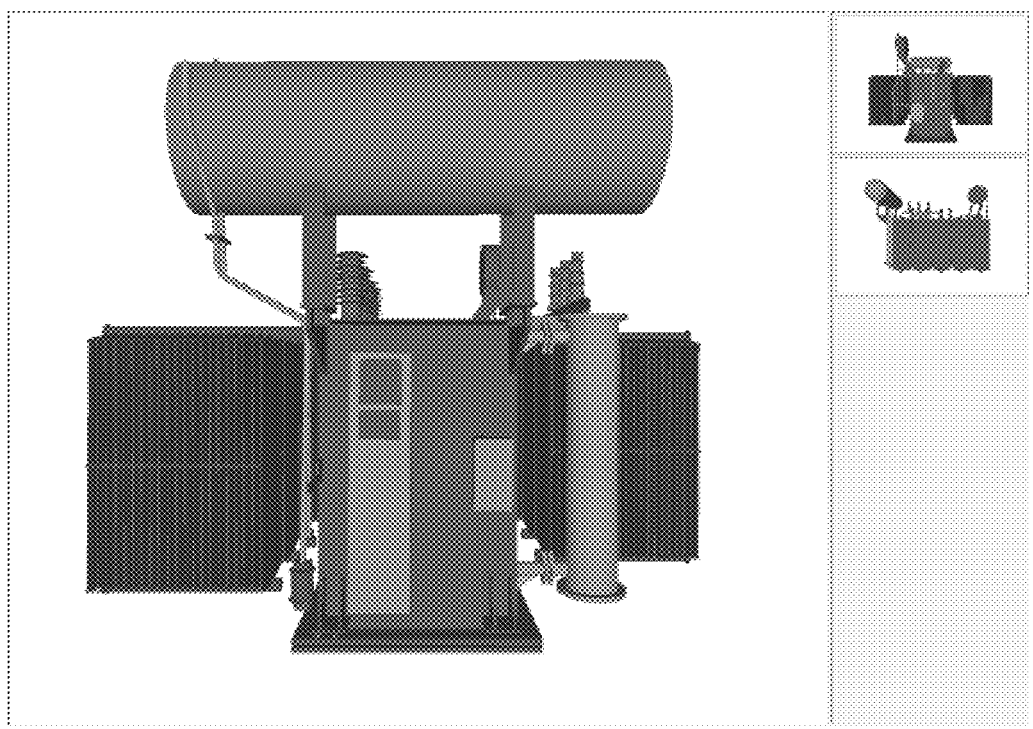
FIG. 8 is a schematic diagram 4 of a display in an embodiment of the 3D synchronous display system with plural computers and plural screens in an application of the invention.
Figure 9:
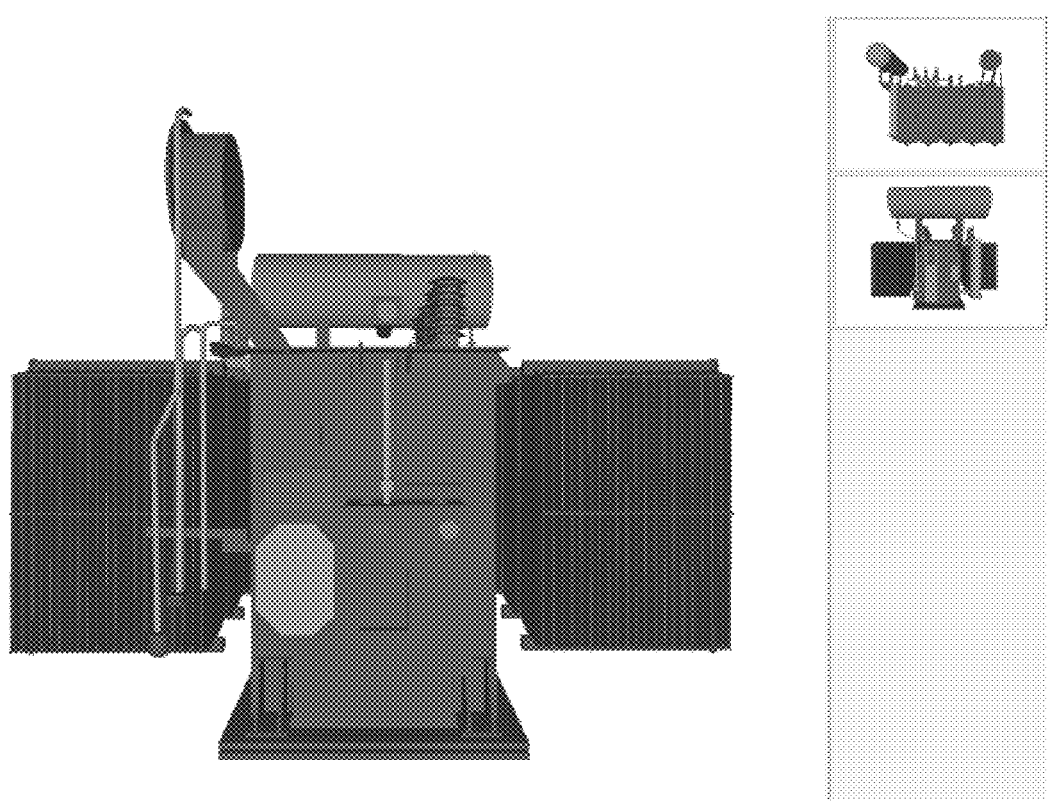
FIG. 9 is a schematic diagram 5 of a display in an embodiment of the 3D synchronous display system with plural computers and plural screens in an application of the invention.
Figure 10:
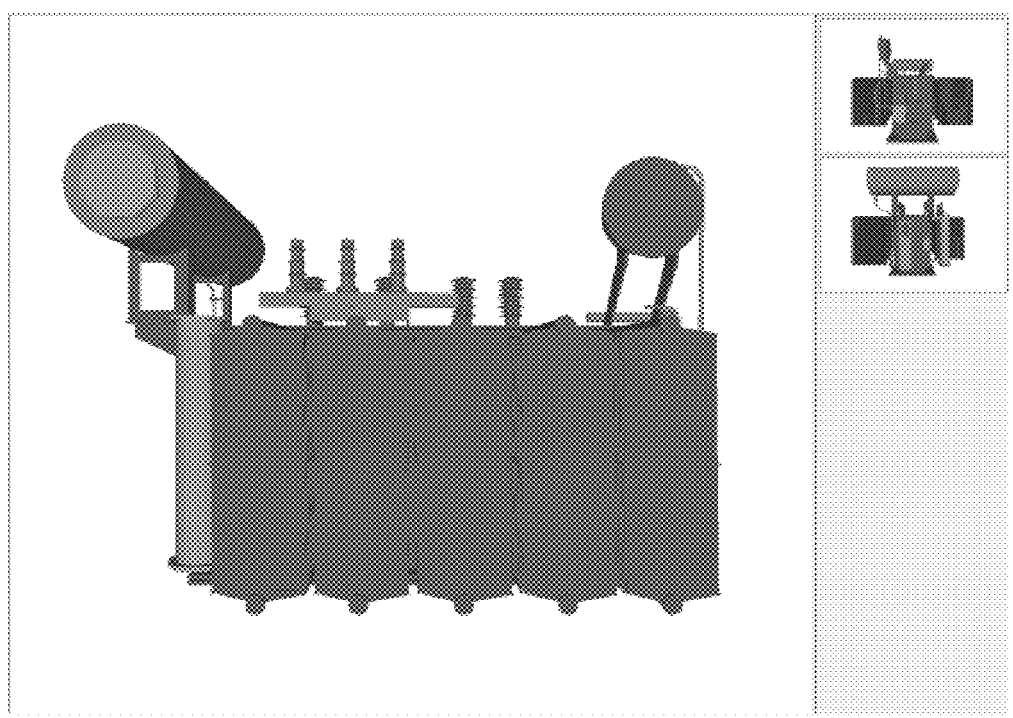
FIG. 10 is a schematic diagram 6 of a display in an embodiment of the 3D synchronous display system with plural computers and plural screens in an application of the invention.

Further to the foregoing scenarios in which the computers A and B have been initiated, if the computer C is also initiated and runs the system thereon, the computer C also loads the corresponding 3D object and displays it at a local default angle of view and also creates two sub-windows corresponding to the computers A and B in which the 3D object is displayed respectively at the angles of view of the computers A and B. At this time, a schematic diagram of the display of the computer C is as illustrated in FIG. 8 in which the main window of the computer C displays a back view of the 3D object and one of two sub-windows displays a front view corresponding to the main window of the computer A and the other one displays a left side view corresponding to the main window of the computer B. Moreover, the computers A and B create sub-windows corresponding to the display angle of view of the computer C respectively. At this time, a schematic diagram of the display of the computer A is as illustrated in FIG. 9 in which the main window of the computer A displays a front view of the 3D object and one of two sub-windows displays a left side view corresponding to the main window of the computer B and the other one displays a back view corresponding to the main window of the computer C; and a schematic diagram of the display of the computer B is as illustrated in FIG. 10 in which the main window of the computer B displays a left side view of the 3D object and one of two sub-windows displays a front view corresponding to the main window of the computer A and the other one displays a back view corresponding to the main window of the computer C.

2. Drawing Process at Peer Computer:

1) A synchronous control trigger operation of a local user is received: the current computer goes to a master status and sends a synchronous control trigger instruction to other computers.

2) A synchronous control trigger operation instruction is received from another computer: the current computer goes to a slave status.

3. Drawing Process at Master Computer:

1) A synchronous control initiation operation of a local user is received: the operation is ignored (a previous synchronous control initiation operation has caused synchronous control trigger operation to be sent to other computers, the current computer has gone to a master status, and the other computers have gone to a slave status).

2) A synchronous control operation of a local user is received: OpenGL display parameters are set in response to a change in the synchronous control operation, an OpenGL 3D display is updated, and a synchronous control instruction is generated from the parameters of the current change operation and sent to other computers in the system.

4. Drawing Process at Slave Computer:

1) A synchronous control initiation operation of a local user is received: the operation is ignored, and the user is reminded of impossibility of any synchronous operation.

2) A synchronous control operation of a local user is received: the operation is ignored, and the user is reminded of impossibility of any synchronous operation.

3) A synchronous control instruction is received from the current master computer: OpenGL display parameters are set in response to a control mode and control parameters contained in the instruction, and an OpenGL display is updated; or 3D object data designated by the instruction is opened and displayed at the designated parameters and a local angle of view.

Figure 11:
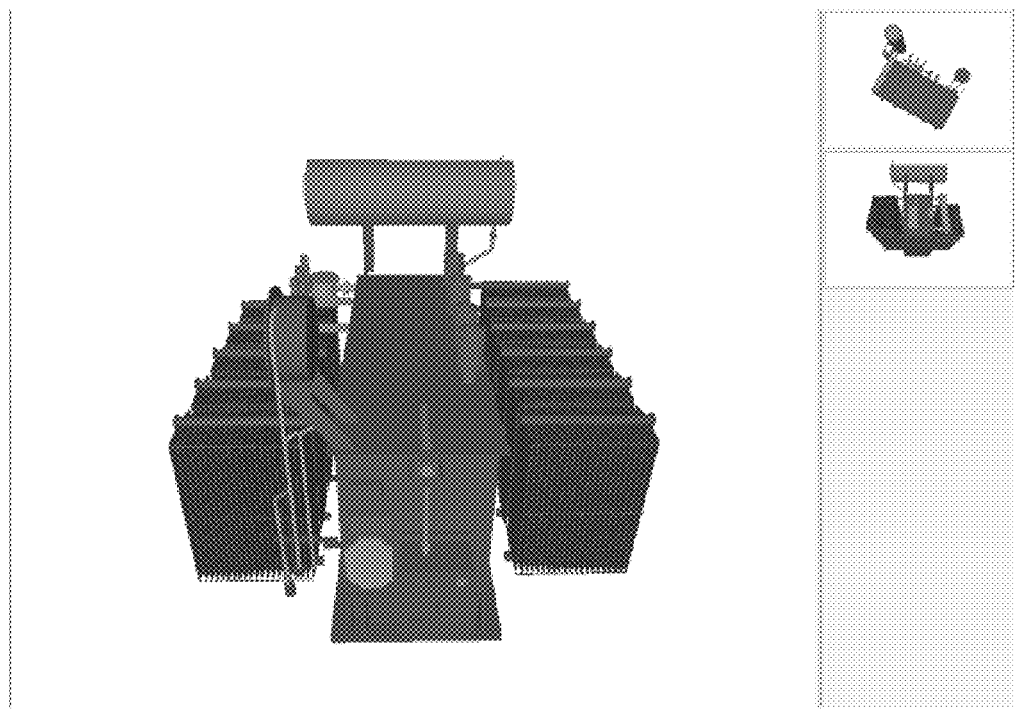
FIG. 11 is a schematic diagram 7 of a display in an embodiment of the 3D synchronous display system with plural computers and plural screens in an application of the invention.

For example, it is assumed that the computer A acting as a master computer rotates the 3D object forward by an angle and that both the computer B and the computer C acting as slave computers rotate the 3D object in the same direction by the same angle. At this time, a schematic diagram of the display of the computer A is as illustrated in FIG. 11 in which the main window of the computer A displays a front top view of the forward rotated 3D object and one of two sub-windows displays a left side view of the clockwise rotated 3D object corresponding to the main window of the computer B and the other one displays a back bottom view of the forward rotated 3D object corresponding to the main window of the computer C.

Figure 12:
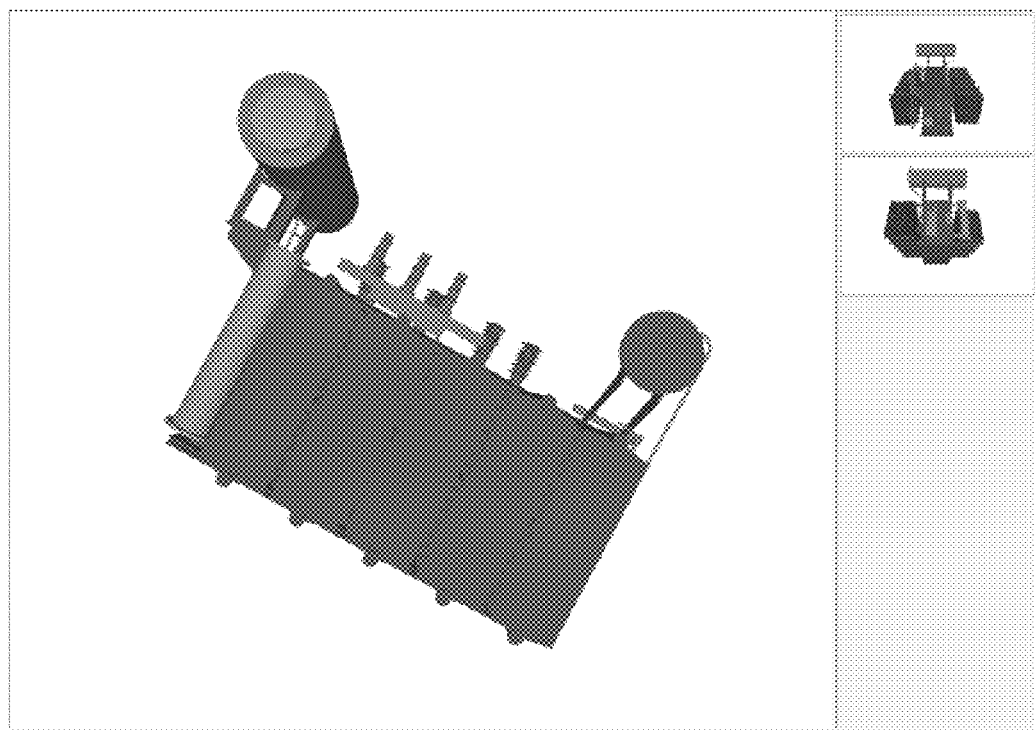
FIG. 12 is a schematic diagram 8 of a display in an embodiment of the 3D synchronous display system with plural computers and plural screens in an application of the invention.

A schematic diagram of the display of the computer B is as illustrated in FIG. 12 in which the main window of the computer B displays a left side view of the clockwise rotated 3D object and one of two sub-windows displays a front top view of the forward rotated 3D object corresponding to the main window of the computer A and the other one displays a back top view of the forward rotated 3D object corresponding to the main window of the computer C.

Figure 13:
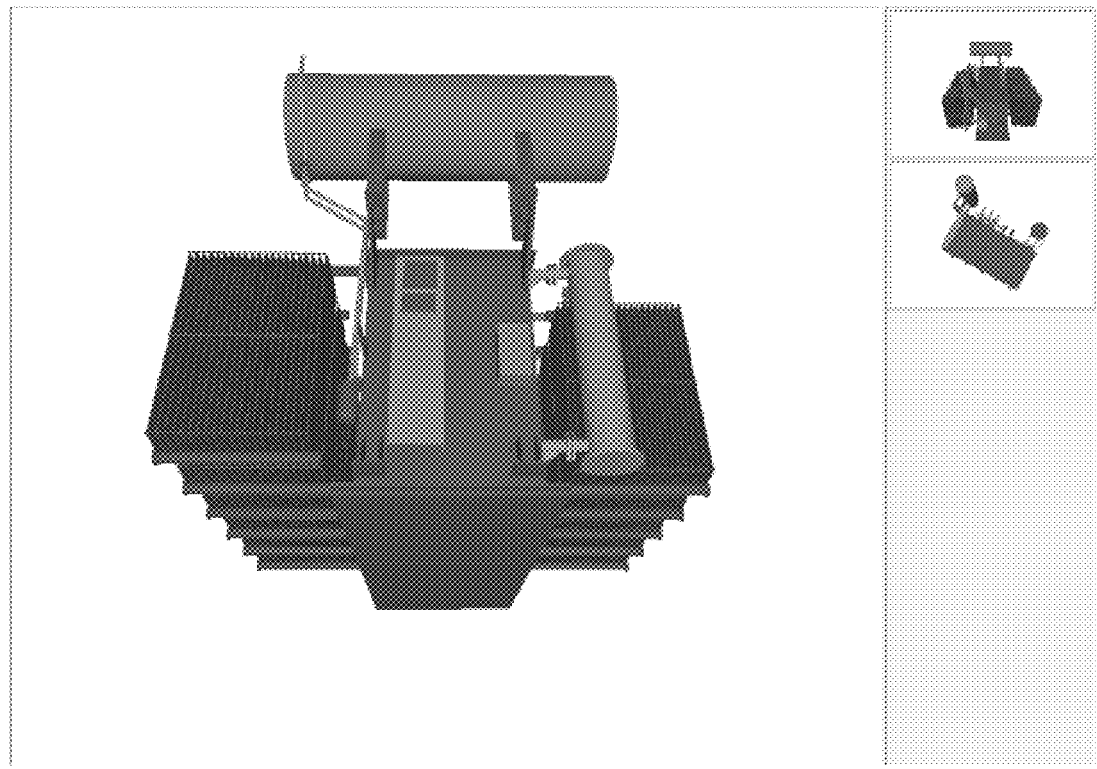
FIG. 13 is a schematic diagram 9 of a display in an embodiment of the 3D synchronous display system with plural computers and plural screens in an application of the invention.

A schematic diagram of the display of the computer C is as illustrated in FIG. 13 in which the main window of the computer C displays a back bottom view of the forward rotated 3D object and one of two sub-windows displays a front view of the forward rotated 3D object corresponding to the main window of the computer A and the other one displays a left side view of the clockwise rotated 3D object corresponding to the main window of the computer B.

As can be appreciated, if any of the initiated computers running the system thereon quits the program, the sub-windows corresponding thereto of the other computers will disappear.

Figure 14:
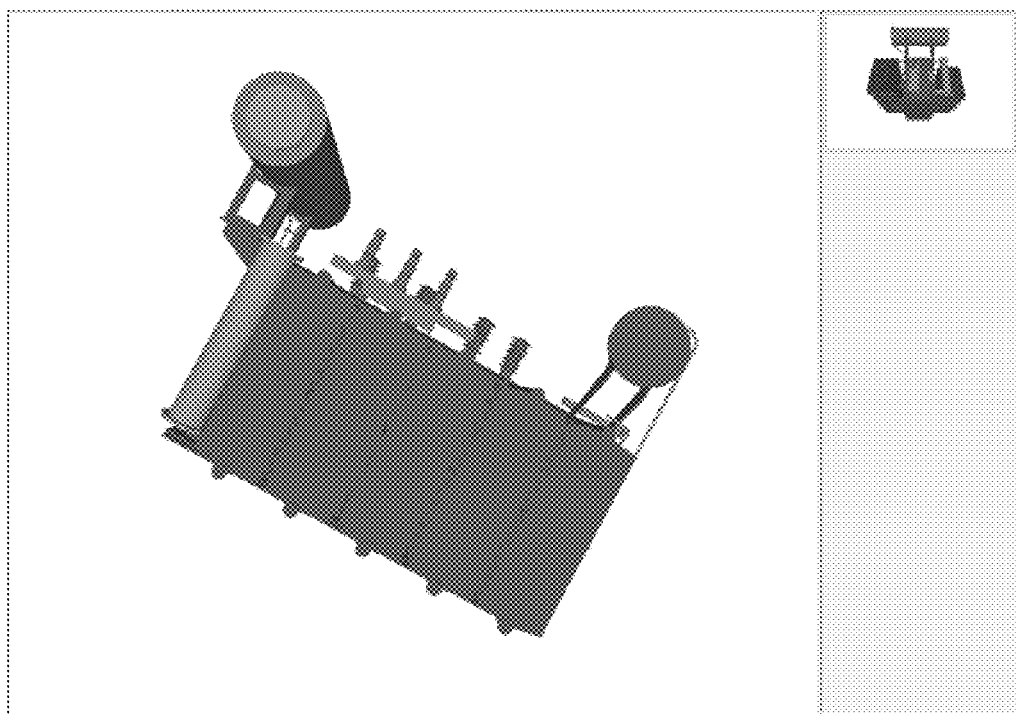
FIG. 14 is a schematic diagram 10 of a display in an embodiment of the 3D synchronous display system with plural computers and plural screens in an application of the invention.
Figure 15:
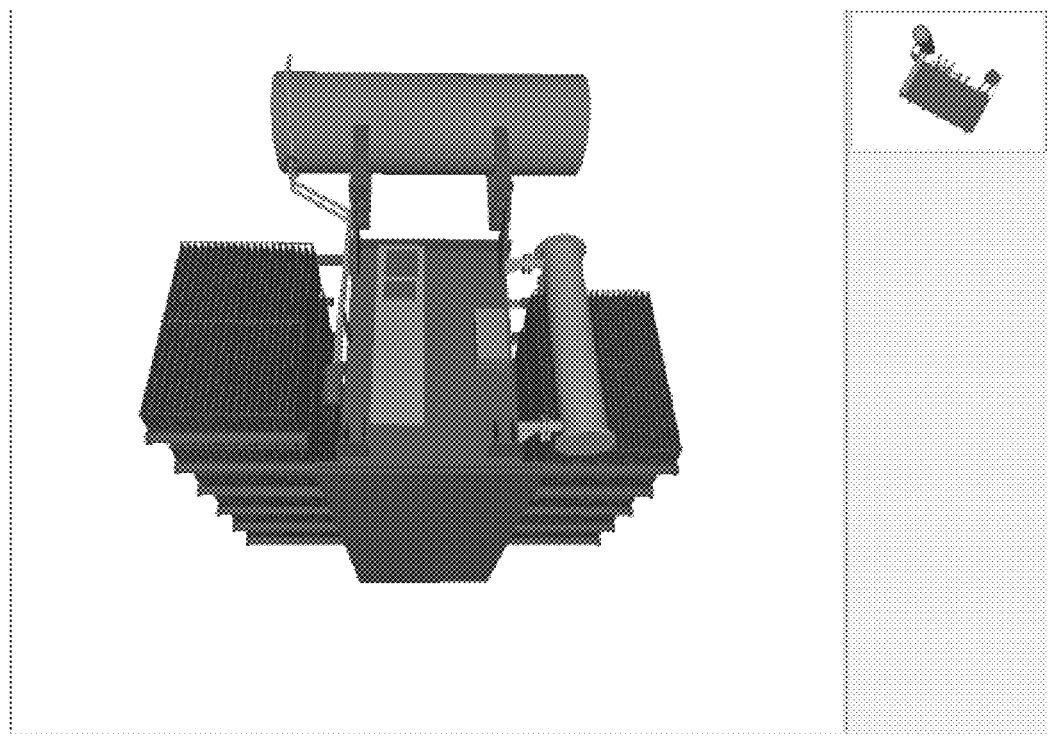
FIG. 15 is a schematic diagram 11 of a display in an embodiment of the 3D synchronous display system with plural computers and plural screens in an application of the invention.

It is assumed that the computer A quits the system, and then a schematic diagram of the display of the computer B is as illustrated in FIG. 14 in which the main window of the computer B displays a left side view of the clockwise rotated 3D object and a sub-window displays a back bottom view of the forward rotated 3D object corresponding to the main window of the computer C. A schematic diagram of the display of the computer C is as illustrated in FIG. 15 in which the main window of the computer C displays a back bottom view of the forward rotated 3D object and a sub-window displays a left side view of the clockwise rotated 3D object corresponding to the main window of the computer B.

Figure 16:
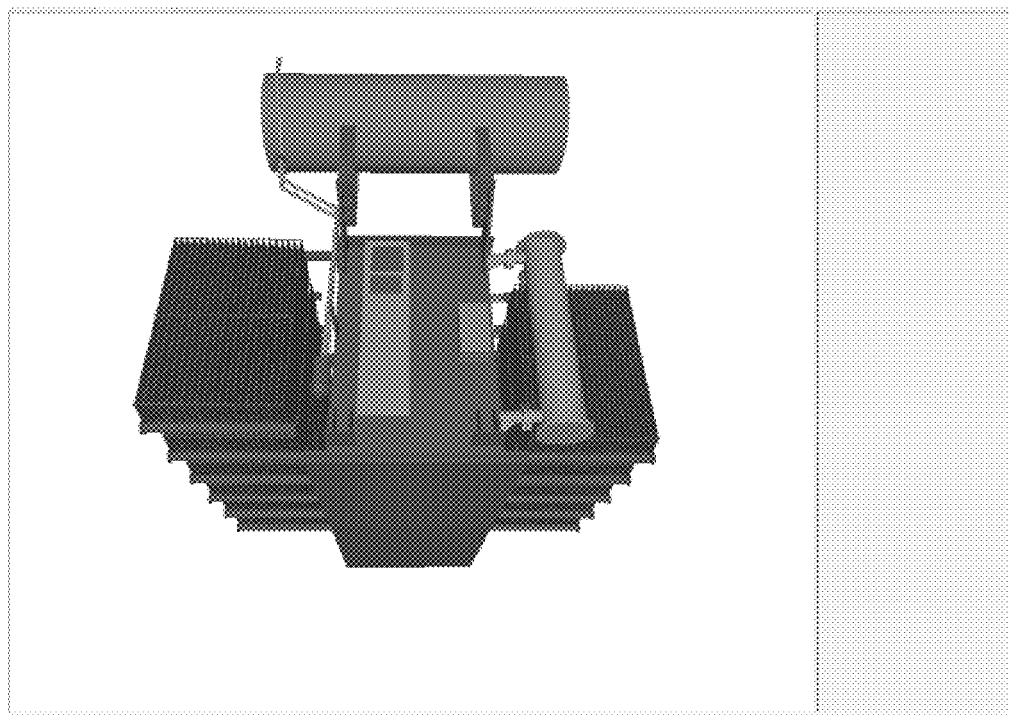
FIG. 16 is a schematic diagram 12 of a display in an embodiment of the 3D synchronous display system with plural computers and plural screens in an application of the invention.

If the computer B also quits the system at this time, a schematic diagram of the display of the computer C is as illustrated in FIG. 16 in which the main window of the computer C displays a back bottom view of the forward rotated 3D object and there is no a sub-window.

Particularly, an OpenGL drawing process can particularly include:

Step F1. An OpenGL display device is created and associated with the current display window. If sub-windows are present, an OpenGL display device will also be created for each of the sub-windows and associated therewith.

Step F2. OpenGL drawing parameters of the respective windows are set as required for drawing, including the positions of a point of view (the X and Y positions will influence translation of the 3D object; and the position Z will influence magnification and minification of the 3D object), the direction of an angle of view (which will influence an angle of view at which the 3D object is observed), a transformation matrix (which will influence rotation of the 3D object), a display mode (which will determine that the 3D object is displayed in a linear mode or in a planar mode), the setting of illumination, etc.

Step F3. The Invalidate( ) function of a designated window is invoked to trigger a display update.

Step F4. The following processes are performed in the message response function OnDraw( ) or OnPaint( ) of the designated window:

A. A corresponding OpenGL context environment is set as the current environment using wglMakeCurrent (m_pDC→GetSafeHdc( ), hrc).

B. An OpenGL display is set, and the 3DS object is OpenGL drawn using Show3DS( ).

Particularly, glPushMatrix( ), glLoadIdentity( ), gluLookAt( ), glMultMatrixf( ), other various OpenGL plotting functions and glPopMatrix( ) are invoked.

C. Foreground and background display buffers are exchanged using SwapBuffers(wglGetCurrentDC( )).

D. The OpenGL context device environment is released using wglMakeCurrent(NULL, NULL).

Since the embodiments of the system substantially correspond to the embodiments of the method, they have been described in brief, and reference can be made to the descriptions of the embodiments of the method for relevant details.

Lastly, it shall further be noted that relational terms such as a/the first, a/the second, etc., in the specification are merely intended to distinguish one entity or operation from another but not require or imply presence of any such a real relationship or sequence between these entities or operations, and that terms "include", "comprise", "contain" and any other variants are intended to encompass non-exclusive inclusion, so that a process, method, article or device including a series of elements include not only those elements but also other elements which are not listed explicitly or further include elements inherent to the process, method, article or device. Unless further defined, elements defined in a phrase "include/comprise . . . " will not exclude presence of one or more additional identical elements in a process, method, article or device including the former.

The foregoing detailed descriptions have been given of a synchronous control method for plural computers, a synchronous control system for plural computers, a 3D synchronous display method with plural computers and plural screens and a 3D synchronous display system with plural computers and plural screens according to the invention. The principle and the embodiments of the invention have been set forth by way of specific examples. The foregoing descriptions of the embodiments are merely intended to facilitate understanding of the method of the invention and the essential idea thereof. Moreover, those ordinarily skilled in the art can make variations to the embodiments and the application scope in light of the idea of the invention. Accordingly, the disclosure of the specification shall not be construed to limit the scope of the invention.

The invention claimed is:

1. A 3D synchronous display method with plural computers and plural screens, wherein the plural computers are connected over a network and provided with display screens comprising a main window and sub-windows, and the method comprises:

maintaining an operation information table on each of the computers connected over the network in response to an initiation message from a joining computer connected over the network, wherein the initiation message comprises 3D object information and display angle-of-view information; the operation information table comprises an IP address of each of the computers in the network and its operation status information; and the operation status information comprises peer status information, master status information or slave status information;

loading respectively on the computers in the network a 3D object in response to the initiation message, and drawing by each of the computers in its main window the 3D object according to a corresponding display angle-of-view information and also generating a sub-window in which the 3D object with a different angle-of-view of other computers in the network than a current computer is drawn;

receiving a 3D object trigger instruction submitted from a user to any of the computers in the network;

if the operation status information of the computer receiving the instruction is peer status information, changing the peer status information to master status information, and submitting a control privilege request message to other computers recorded in the operation information stable;

receiving by the other computer the control privilege request message, and changing its operation status information to slave status information;

receiving a 3D object operation instruction submitted from the user to the computer with master status information, and updating the drawings of the 3D object respectively in the main window and the sub-window of the current computer in response to the instruction; and generating from the drawing update operation and sending a corresponding operation request to a corresponding computer with slave status information, and updating by the computer with slave status information the drawings of the 3D object respectively in its corresponding main window and sub-window in response to the operation request.

2. The method according to claim 1, wherein the operation information table further comprises a priority parameter, and the method further comprises:

comparing the priority parameters of the computers receiving the instruction, and selecting one of the computers with a highest priority as the computer subject to a status determination step.

3. The method according to claim 2, wherein the priority parameter is generated from an initiation time and an address information of each of the computers in the network.

4. The method according to claim 3, further comprising:

recording in the operation information table of each of the computers in the network the time that the computer with master status information sends the control privilege request message; and determining one of the computers with an earliest time that the control privilege request message is sent or with the same time that the control privilege request message is sent and with a higher priority parameter as a computer with master status information, and changing the operation status information of other corresponding computers to slave status information.

* * * * *